United States Patent

Shelef et al.

[11] Patent Number: 5,968,463
[45] Date of Patent: Oct. 19, 1999

[54] NO$_X$ SELECTIVE REDUCTION CATALYST WITH BROADENED ACTIVE TEMPERATURE RANGE

[75] Inventors: Mordecai Shelef, Bloomfield Village; Woosang Chun, Plymouth, both of Mich.

[73] Assignee: Ford Global Technologies, Inc., Dearborn, Mich.

[21] Appl. No.: 09/096,829

[22] Filed: Jun. 12, 1998

[51] Int. Cl.$^6$ ............... B01J 8/02; B01J 29/06; B01J 21/00
[52] U.S. Cl. ............ 423/213.5; 502/65; 502/75
[58] Field of Search ............ 423/213.2; 502/73, 502/65

[56] References Cited

U.S. PATENT DOCUMENTS 4,584,287  4/1986  Ward ............................ 502/65

FOREIGN PATENT DOCUMENTS

0485180 B1  5/1991  European Pat. Off. ......... 502/73

OTHER PUBLICATIONS

ESR study of Rh/y–Al$_2$O$_3$ and Rh/HZSM–5 promoted by Cu$^{2+}$, Gd$^{3+}$, PO$^{3-}_4$, by A.V. Kucherov*, S. G. Lakeev and M. Shelef, Applied Catalysis B: Environmental 16 (1998) 245–254.

Spectroscopic studies of the stability of zeolitic deNO$_x$ catalysts, by M. J. Rokosz, A. V. Kucherov, H.–W. Jen, and M. Shelef, Catalysis Today 35 (1997) 65–73.

*Primary Examiner*—Wayne Langel
*Assistant Examiner*—Maribel Medinasanabria
*Attorney, Agent, or Firm*—Lorraine S. Melotik

[57] ABSTRACT

The invention is a selective reduction catalyst useful for converting exhaust gases generated by a lean-burn engine where the atmosphere is oxidizing. The catalyst comprises zeolite containing two forms or rhodium, small metal particles and ion-exchanged into the zeolite, the latter being in significant excess. In addition, the catalyst contains a rare-earth metal having primarily a +3 or higher valence such as lanthanum in a significantly higher amount relative the total amount of rhodium.

18 Claims, 3 Drawing Sheets

$NO_x$ SELECTIVE REDUCTION CATALYST WITH BROADENED ACTIVE TEMPERATURE RANGE

FIELD OF THE INVENTION

The invention is directed to a catalyst useful to reduce nitrogen oxides in an oxidizing atmosphere (lean-burn operation), such catalysts are often termed "Selective Reduction Catalysts" (SRC). The catalyst comprises zeolite and contains rhodium in two forms: metallic particles and ion-exchanged species, the zeolite being stabilized with a material like lanthanum oxide or other rare earth oxides.

BACKGROUND OF THE INVENTION

Catalysts are employed in the exhaust systems of automotive vehicles to convert carbon monoxide, hydrocarbons, and nitrogen oxides (NOx) produced during engine operation into non polluting gases. When the engine is operated in a stoichiometric or slightly rich air/fuel ratio, i.e., between about 14.7 and 14.4, catalysts containing precious metals like palladium and rhodium are able to efficiently convert all three gases simultaneously. Hence, such catalysts are often called "three-way" catalysts.

It is desirable, however, to operate gasoline engines under "lean-burn" conditions where the A/F ratio is greater than 14.7, generally between 19 and 27, to realize a benefit in fuel economy. Fuel efficient diesel engines also operate under A/F ratios greater than 19, generally 19–40. Such three-way catalysts are able to convert carbon monoxide and hydrocarbons but are not efficient in the reduction of NOx during lean-burn (excess oxygen) operation. Efforts have thus been made in developing SRC in recent years. Such catalysts act to reduce the NOx through the use of hydrocarbons over a catalyst, the hydrocarbons being in turn oxidized.

Often these catalysts are based on zeolite materials containing a precious metal like platinum which can have major drawbacks. Among the most important are a narrow temperature range of operation and loss of activity (and sometimes physical integrity) under the hydrothermal conditions of automotive exhaust gases. For example, a zeolite material carrying platinum is generally only active at a relatively low temperature, i.e., less than 250° C. At higher temperatures the competitive oxidation of the reductant hydrocarbon molecules by oxygen is so fast that the removal of NOx drops off precipitously with rising temperature so as to make such catalyst inadequate for treating somewhat hotter exhaust streams. Conversely, when the active sites are transition metal ions exchanged into the cationic sites of the zeolite, the onset of SCR activity begins at temperatures greater than 400° C., which renders the catalyst inactive for catalysis during a large portion of the necessary temperature range of the desired catalytic operation. And the stability of an automotive catalyst in dry gases is insufficient to assure the proper long-term function in the presence of steam, as is the case in automotive exhaust. Exposed to such conditions the zeolite becomes "dealuminated" whereby the cationic sites where the divalent exchanged ions are anchored are destroyed.

We have found that these problems associated with conventional zeolites can be overcome with the catalyst of the present invention. In particular, the invention catalyst is a selective reduction catalyst, stabilized against dealumination and resistant to poisons such as sulfur dioxide and water vapor and active in the temperature range pertinent particularly to use in diesel powered vehicles and vehicles powered by other lean-burn power plants.

DISCLOSURE OF THE INVENTION

The invention is a selective reduction catalyst useful for lean-burn exhaust gas treatment, the catalyst comprising:

(a) zeolite having a $SiO_2/Al_2O_3$ ratio between 20 and 100;

(b) rhodium in a total amount of 0.3–5.0 wt. % (preferably 0.5 to 3 wt. %) based on the weight of the zeolite, the rhodium being distributed in the zeolite in two forms: (i) small metal particles and (ii) ion-exchanged into the zeolite, where the amount of the rhodium particles is 3 to 4 times the weight of the ion-exchanged rhodium, and wherein the catalyst is essentially free of other monovalent or divalent metal ions; and (c) rare-earth ions having +3 or higher as a their primary ionic valence, these ions acting to stabilize the zeolite, and being present in 2–10 wt. % based on the weight of the zeolite and being present in a weight amount at least five times the total weight of rhodium in the catalyst.

In another aspect, the invention is directed to a method of treating lean-burn exhaust gases by having the gases contact the catalyst disclosed above.

DETAILED DESCRIPTION OF PREFERRED EMBODIMENTS

Figure 1:
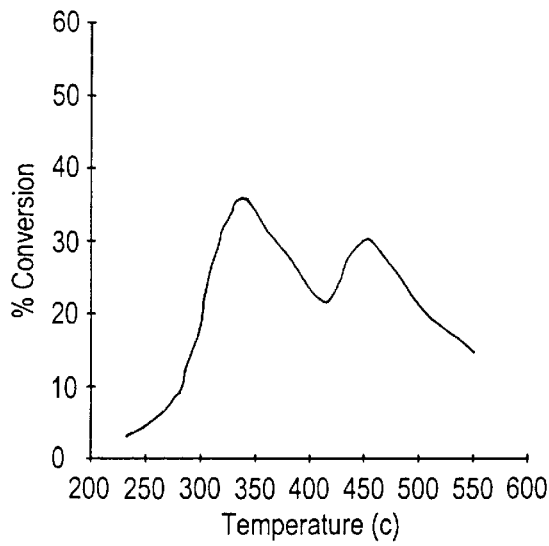
FIG. 1 is a graph of $NO_x$ conversion vs. temperature for a powder sample of a present invention catalyst of Example 1 containing 1% Rh and 5% La in a simulated exhaust stream without water or $SO_2$.

The SRC disclosed above is particularly useful for lean-burn exhaust gas treatment of internal combustion engines, most particularly automotive vehicle engines where the A/F ratio of the engine is generally greater than 19, most often, 19–40. The fuel may be gasoline or diesel. It is particularly useful for the latter since diesel engines operate at lower temperatures and the present invention SRC has not only a broadened active higher temperature range, but also extends into the lower temperature range.

The catalyst may be in a powder form or pelleted solid form, each in its broadest aspect includes: zeolite; rhodium distributed in two distinct forms, small metallic particles and exchanged as isolated ions; and rare-earth ions. By small particles is meant herein that the rhodium metal particles are, on average, preferably 10–500 nanometers in diameter, more preferably 20 to 100 nanometers.

Critical aspects of the invention include having the rhodium in two forms wherein the small metallic particles form is in significant excess over the ion-exchanged form, and a rare-earth stabilizing element like lanthanum in a relatively high concentration, i.e., with the active catalyst element, rhodium, present at a relatively low concentration. Further, essentially no other monovalent or divalent exchangeable ions should be present as they may displace the Rh from the cationic positions. And in order that the stabilizing ion as well should not interfere with the exchangeability of the rhodium into the cationic sites of the zeolite, the stabilizing ion should have as its most common oxidation state: +3 or higher.

More particularly, the zeolite has a $SiO_2/Al_2O_3$ ratio between 20 and 100 and can be selected from available and well known zeolites of this type, including but not limited to ZSM-5, other pentasil zeolites, offretites, mordenites and the like. Preferably, the $SiO_2/Al_2O_3$ ratio is between 30 and 80 to assure sufficient exchangeable cationic sites and resistance to hydrothermal effects. Also, the zeolite preferably has a particle size in the micron (one millionth of a meter) range.

As disclosed above, the catalytically active noble metal rhodium (Rh) is critically included in the present invention in two forms: (1) small metal particles, and (2) ions in cationic sites in the zeolite. We have found that this bimodal aspect of the rhodium in the SRC provides a widening of the temperature window during which the SRC is catalytically active for the nitrogen oxides conversion in the exhaust gas. The small metallic rhodium particles are active at the low-temperature end, starting at around 250° C. while the exchanged, isolated rhodium active ions extend this range to at least 450° C. which is the optimal range for diesel and other internal combustion power plants operating with lean fuel mixtures.

Rhodium is included in total in the invention catalyst in 0.3–5.0 wt. % as the total concentration of its two forms based on the weight of the zeolite. The catalyst can be a powder (generally washcoated on a substrate) or pellets, in each case the total rhodium concentration is 0.3%–5.0% (by weight). We believe that the excellent reducing properties of the present invention catalyst towards NOx in an oxidizing atmosphere are associated with the use of rhodium. More particularly, rhodium is believed to be less sensitive to deactivating substances such as $SO_2$ or water than zeolitic catalysts with base metal active ingredients such as copper, cobalt or iron and yet is well anchored in the cationic exchange sites.

As is known in the art, for useful application of the catalyst in an exhaust system, the catalyst will be deposited or washcoated on a substrate (mechanical carrier) made of a high temperature stable, electrically insulating material such as cordierite, mullite, etc. A mechanical carrier is preferably comprised of a monolithic magnesium aluminum silicate structure (i.e., cordierite), although the configuration is not critical to the catalyst of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

If the SRC is to be applied to the substrate, rather than being used in pellet form, the powder SRC can be made into a slurry with liquid, usually water, and then coated on the substrate followed by drying. Applying the powder described above onto a monolith should result desirably in a loading of rhodium in total of 0.15–1.0 wt. % on a finished substrate (based on the weight of the substrate).

As discussed above, it is critical to the invention properties that the rhodium is distributed generally as a substantially uniform mixture in the zeolite in two forms, i.e., (1) small metal particles and (2) ion-exchanged into the zeolite. The rhodium particles, i.e., crystalline rhodium, are present in a larger amount of 3 to 4 times by weight the amount of ion-exchanged rhodium. The rhodium may be incorporated into the catalyst by conventional techniques including wet impregnation techniques from soluble rhodium compounds. Water soluble compounds are preferred, including, but not limited to nitrate, salts. In addition to this incorporation from a liquid phase, the rhodium may be provided by sublimation of rhodium chloride or other volatile rhodium salts: by solid state exchange in the 300–500° C. temperature range using labile Rh compounds. It is also critical that the zeolite is essentially free of other ion-exchangeable monovalent or divalent metal ions. If other ion-exchangeable ions of low valence are allowed to be incorporated into the zeolite, we have found that they will undesirably replace rhodium ions ion-exchanged into the zeolite or compete for those cationic positions.

We found that if a certain amount of rhodium was incorporated for ion-exchange, such as 0.25–0.30% wt % Rh, it moved into the cationic sites where it remains anchored without aggregating as metallic particles under a wide range of conditions. We established that if more Rh is incorporated into the zeolite, the excess over the exchanged part aggregates into discrete particles of the noble metal. Hence, incorporating rhodium in the amounts required in the present invention leads to both ion-exchanged and metallic particles forms. The present invention SRC thus contains two kinds of active sites: small metallic aggregates which are particularly active in the lower end of the temperature range and exchanged ionic sites which are particularly active further up the temperature scale.

We believe that the anchoring of the rhodium by the zeolite and the associated chemical interaction stabilize the rhodium ionic form. This behavior was confirmed by following the electron paramagnetic resonance signal (EPR) associated with divalent $Rh^{2+}$ ions. In "ESR study of Rh/γ-$Al_2O_3$ and Rh/HZSM-5 promoted by $Cu^{2+}$, $Gd^{3+}$, and $PO_4^{3-}$" by A. V. Kucherov, S. G. Lakeev, M. Shelef, Applied Catalysis B: Environmental 16 (1998) 245–254 we reported that the behavior of EPR signals originating from $Rh^{2+}$ and $Gd^{3+}$ the latter serving as a generic trivalent stabilizing additive, proves that the stabilizing ions do not displace the exchanged $Rh^{2+}$ ions. Conversely the EPR signals taken simultaneously from $Rh^{2+}$ and $Cu^{2+}$ ions indicated that the rhodium ions are displaced from the cationic positions by the copper ions.

The invention catalyst also includes a relative high amount of stabilizer, as compared to the active metal rhodium, for the zeolite: rare-earth ions having +3 or +4 (preferably) or higher as a their primary ionic valence, especially the +3 valence ions. These ions stabilize the zeolite against dealumination thereby attenuating the deactivation by agglomeration of the active $Rh^{2+}$ ions which have been ion-exchanged in the cationic positions. Without the stabilizer, in the presence of moisture i.e. under hydrothermal conditions, this portion (the ion-exchanged portion) of the metal aggregates and the higher temperature end activity of the SRC is gradually lost.

The concentration of the stabilizing rare-earth in the SRC in the powder or zeolitic pellets is from 2%–10% by weight of the zeolite; whereas on the finished substrate it is preferably 0.4%–3.0% by weight of the substrate, i.e., monolithic, finished body. The optimal amount to be present in the SRC depends on such factors as: the steam content of the exhaust gas and the temperature range to which the catalyst may be exposed in use, and selection would be apparent to one skilled in the art in view of the present disclosure. While we have found that the most effective rare earth ion is $La^{3+}$ as the stabilizer, other ions from this series of elements, either individually or mixtures thereof, may be used including Ce, Gd, Pr, Y and still other rare earth ions. The reason that the stabilizer ion should preferably have the valence of +3 is that we have found that ions which have a lower valence have the tendency to replace the rhodium ions, lowering the activity of the catalyst for reduction of NOx. The stabilizing rare-earth, e.g., lanthanum, may be introduced to the zeolite most easily by impregnation from liquid phase or by solid state diffusion using a labile La compound.

It was very important to establish whether the introduction of such a large amount of rare-earth stabilizer would dislodge the exchanged divalent Rh ions from their cationic position. This was done by EPR of $Rh^{2+}$ and we established that even when the La-ions are introduced first and the sample is calcined at 550° C. before the introduction of Rh, the latter diffuses to the cationic positions and is anchored there as divalent ions. To further confirm the non-interference of the stabilizers we employed a stabilizing rare earth, $Gd^{3+}$, which is EPR-active. We established that in samples containing ca. 1 wt % Rh and ca. 5 wt % Gd the two EPR signals do not displace each other but are superimposed. This can be taken as direct proof that the rare-earth stabilizers employed in the present invention SRC do not displace the divalent rhodium ions from cationic positions.

EXAMPLE 1

A SRC powder catalyst according to an embodiment of the present invention was made as follows. A 15 ml solution of $Rh(NO_3)_3$, made of 7.4 ml of 0.0136 g Rh/ml stock solution plus 7.6 ml of water, was added to 10 gram $NH_4ZSM$-5 ($SiO_2/Al_2O_3$=50 or Si/Al=25) from PQ Corporation, Valley Forge, Pa., to impregnate the zeolite with Rh to a loading of 1 wt. %. Although the measured incipient wetness of the zeolite required only 1063 microliter/g zeolite, or 10.63 ml/10 gram zeolite, additional water was added to allow for ion exchange. The resulting slurry was stirred overnight and dried in the oven at 50° C. overnight. The dried sample was then calcined in air at 550° C. for 5 hours. Subsequently, 15 ml solution of $La(NO_3)_3 \times 6H_2O$ (1.56 g $La(NO_3)_3 \times 6H_2O$ in 15 ml of water) was added to 10 grams of the Rh-ZSM5 material to stabilize it with 5 wt % La, based on the weight of the initial zeolite. After the La impregnation, the same drying and calcination procedure was repeated. The powder sample was treated at 400° C. for 2 hours in 10% hydrogen in helium carrier gas at a flow rate of 130 cc/min.

The catalytic activity of this present invention SRC powder was tested by a temperature sweep method. The reactor feed gas comprised 500 ppm NO, 4% oxygen, 1200 ppm hydrocarbon as $C_3$ in nitrogen ($C_3H_6/C_3H_8$=2), and balance helium. A flow rate of 125 cc/min feed gas was used for 40 mg powder sample. This is equivalent to 125×60/0.04=187,500 cc/hr×g of catalyst. Assuming that one g of the catalyst powder occupies the volume of 0.5 cc, this is a very high space velocity of the order of 400,000 $hr^{-1}$. In an actual automotive catalyst the catalyst powder washcoat will occupy ca. 1/10 of the total catalytic monolith which will make the equivalent automotive space velocity fall in the usual range of ca. 40,000. The catalyst temperature was ramped at a rate of 9° C./min from ambient to 550° C. for the sweep test of NOx conversion.

Figure 2A:
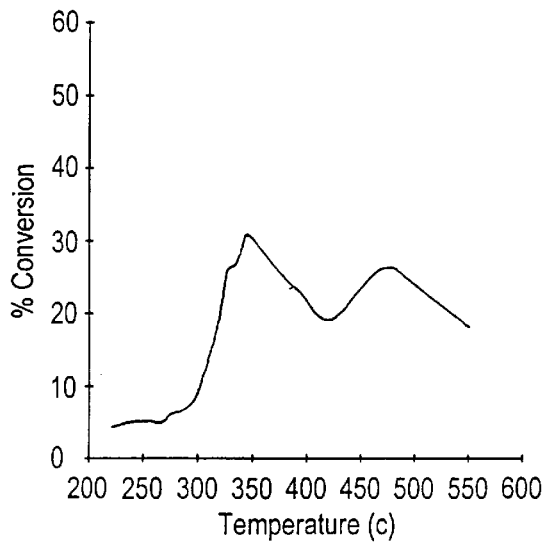
FIG. 2a is a graph of $NO_x$ conversion vs. Temperature for the Example 1 powder sample catalyst in a simulated exhaust stream without water or $SO_2$ after aging (temperature upsweep).
Figure 2B:
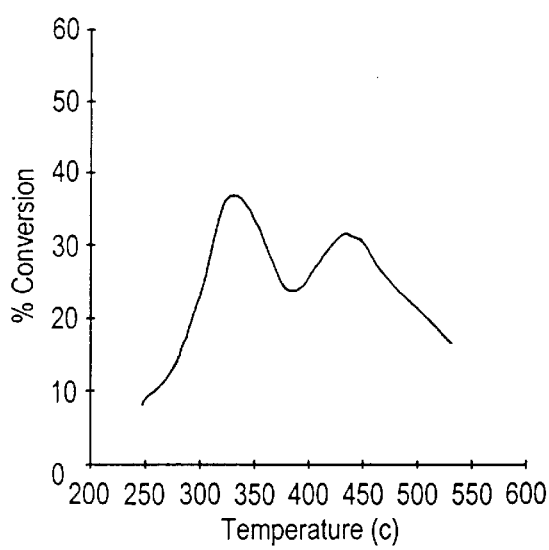
FIG. 2b is a graph of $NO_x$ conversion vs. Temperature for the Example 1 powder sample catalyst in a simulated exhaust stream without water or $SO_2$ after aging (temperature downsweep).

For aging, this catalyst was operated in the described feed gas continuously for 24 hours at 350° C. (in the absence of water). FIG. 1 shows the $NO_x$ conversion clearly reflecting the bimodal activity behavior with an average conversion over 300–500° C. temperature range of ca. 30%. FIG. 2a shows the test result after aging on the upsweep and FIG. 2(b) on the downsweep. The main characteristics of the temperature sweep test remain unaltered showing the reproducibility of the conversion results.

Figure 3:
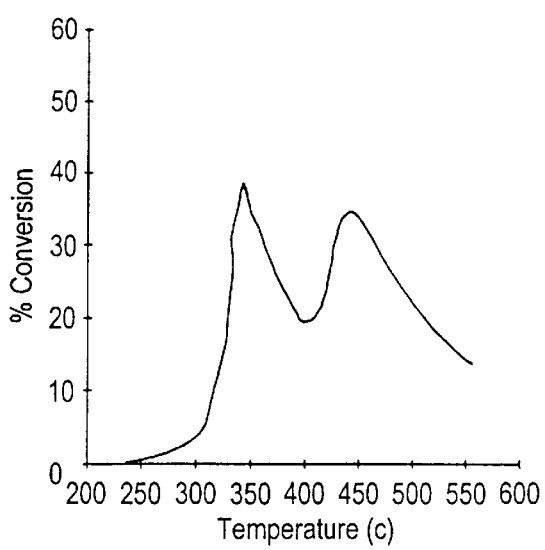
FIG. 3 is a graph of $NO_x$ conversion vs. Temperature for the Example 1 powder sample catalyst in a simulated exhaust stream with 5.3% water.

Another sample of the powder made in this example was tested with 5.3% water in the gas stream (FIG. 3). The general features of activity (bimodality, temperature range and conversion) were essentially repeatable.

EXAMPLE 2

Preparation of pelleted La-Rh/ZSM-5 Catalyst (10 g sample containing ~1 wt % Rh and ~5 wt % La) according to an embodiment of the present invention. Substrate: HZSM-5, $SiO_2/Al_2O_3$=30/1 containing 20 wt % additional $Al_2O_3$ as binder; substrate is rod-shaped (~1 mm diameter, variable length 5–8 mm) obtained from Zeolyst International, Conshohocken, Pa.

(a) 20 g of the zeolite substrate pellets were added to a $Rh(NO_3)_3$ solution to impregnate/exchange the Rh. The nitrate solution was made of 1.432 g of $Rh(NO_3)_3$ stock solution (Alfa-Aesar, Ward Hill, Mass.) 13.97% Rh by weight) diluted to 45 ml with distilled water.

(b) The zeolite in the nitrate solution was stirred for 2 minutes (further stirring caused turbidity by abrasion). The mixture was then left unstirred over the weekend. After 72 hours the sample was filtered and dried at 50° C. for 4 hours, and dried again at 120° C. overnight. The sample was then calcined in air at 550° C. for 4 hours.

(c) The Rh-impregnated sample (18.7 g) was added to 30 ml solution containing 2.92 g $La(NO_3)_3 \cdot 6H_2O$ and left unstirred (after brief swirling) for 4 hours. It was drained and dried at 55° C. overnight. The sample was then calcined again in air at 550° C. for 4 hours.

(d) Sample Reduction: The catalyst sample was treated at 400° C. for 2 hours in a stream of 1 liter/min of 24% $H_2/N$ gas, and cooled to room temperature in the same gas stream.

Catalytic Activity Testing of Pelleted Specimens in an Experimental Reactor

Feed gas composition: 1200 ppm HC as $C_3$ ($C_3H_6/C_3H_8$=2); 4% Oxygen; 500 ppm NO; 20 ppm $SO_2$; $N_2$ balance. Space velocity: 30000 $hr^{-1}$ based on catalyst bed volume (mass hourly SV=45 liter/g hr). Catalyst furnace temperature was ramped at a rate of 5° C./min and catalyst temperature was measured by a thermocouple located at mid-bed. The results of the catalytic testing of the pelleted samples are presented in Figures numbered from 4–7.

Figure 4:
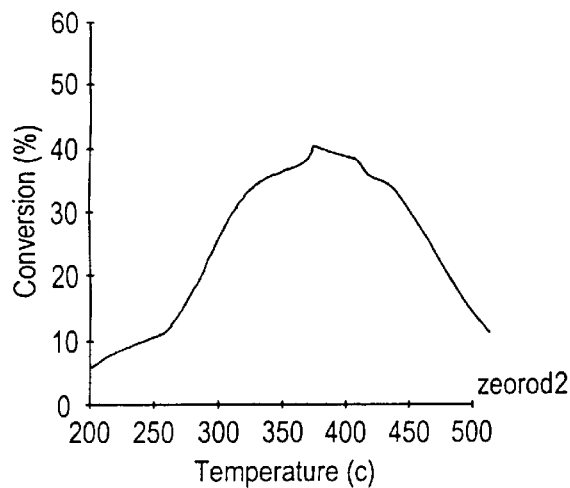
FIG. 4 is a graph of $NO_x$ conversion vs. Temperature for the Example 2 unreduced pelleted catalyst according to an embodiment of the present invention containing 1% Rh and 5% La in a simulated exhaust stream without water or $SO_2$.
Figure 5:
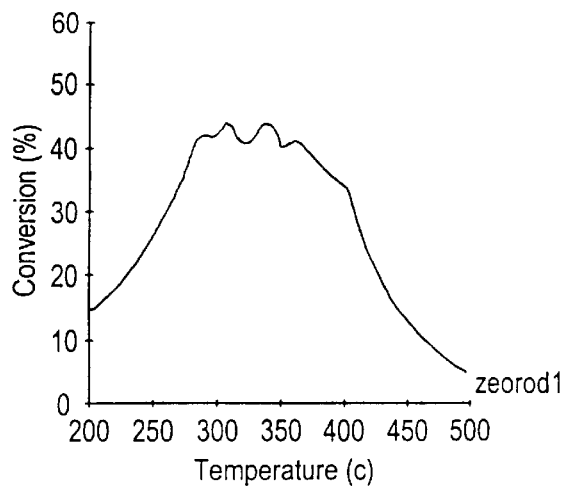
FIG. 5 is a graph of $NO_x$ conversion vs. Temperature for the Example 2 reduced pelleted catalyst in a simulated exhaust stream without water or $SO_2$.
Figure 6:
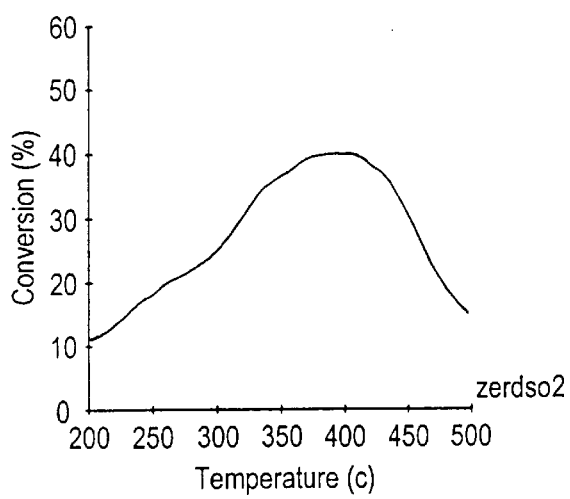
FIG. 6 is a graph of $NO_x$ conversion vs. Temperature for the pelleted Example 2 catalyst containing in a simulated exhaust stream without water and with 20 ppm $SO_2$.
Figure 7:
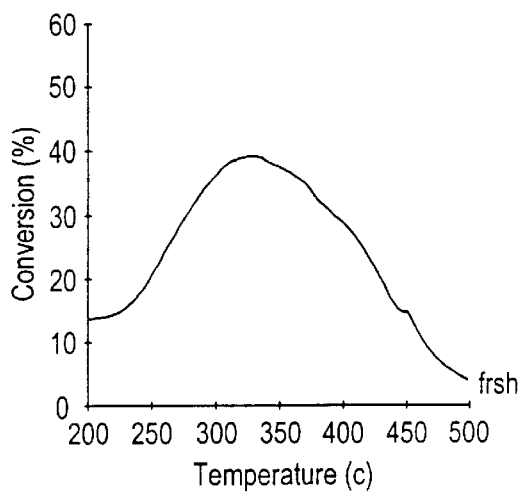
FIG. 7 is a graph of $NO_x$ conversion vs. Temperature for the pelleted Example 2 catalyst in a simulated exhaust stream with 3% water and with 20 ppm $SO_2$.

FIGS. 4,5 indicate that NO conversion is repeatable and reproducible and exceeds 30% in the 300–450° C. temperature range. The presence of 20 ppm $SO_2$ in the gas does not influence this behavior as shown on FIG. 6. FIG. 7 shows that the presence of 3% water also has minimal effect on the selective NO conversion of the pelleted catalyst.

The main difference between the powder an pelleted catalysts is the absence of the double hump in the latter, possibly indicating an overlap in the activity temperature ranges of the exchanged and particles Rh in the case of the pelleted specimens. For practice the continuous broad activity range is preferable.

EXAMPLE 3

This example describes the preparation of monolithic samples La-Rh ZSM-5 samples made according to an embodiment of the present invention. Button-shaped specimens (0.75 inch diameter, 0.5 inch long) cut out of monolithic cordierite catalyst supports having 400 openings per one square inch of cross-section were coated with the catalytically active material by dipping in a slurry of the ZSM-5 catalyst powder containing La and Rh and prepared according to the same procedure described in Example 1 and draining the excess washcoat from the channels before drying overnight in an oven. The consistency of the washcoat slurry was adjusted so that the walls of monolith channels were coated with the porous zeolitic catalyst material and, at the same time, the channels were clear for the passage of the treated gas. The amount of catalytic material on the monolith substrate was determined by the difference in weight before and after the coating and was 20–30% of the finished specimen after drying resulting in monlithic specimens containing 0.17–0.30% Rh (by weight) and correspondingly five-fold amounts of La.

The testing of the pre-reduced monolithic samples in a stream of nitrogen containing 500 ppm NO, 1200 ppm carbon (C) as propylene and propane in a 2:1 ratio, and 4% oxygen and a space velocity of 30,000 $hr^{-1}$ (relative to the volume of the whole monolith) gave conversions of NO in the 26–35% range at the optimum temperature range of 300–350° C.

EXAMPLE 4

Preparation of pelleted Pr-Rh/ZSM-5 Catalyst (20 g sample containing ~1 wt % Rh and ~5 wt % Pr) according to an embodiment of the present invention. Substrate: H-ZSM-5, $SiO_2/Al_2O_3$=30/1 containing 20 wt % additional $Al_2O_3$ as binder; substrate is rod-shaped (~1 mm diameter, variable length 5–8 mm) obtained from Zeolyst International. Steps:

(a) 10 g of the zeolite substrate pellets were added to a $Rh(NO_3)_3$ solution to impregnate the Rh. The nitrate solution was made of 0.716 g of $Rh(NO_3)_3$ stock solution (Alfa-Aesar, 13.97% Rh by weight) diluted to 20 ml with distilled water.

(b) The zeolite in the nitrate solution was stirred for 2 minutes (further stirring caused turbidity by abrasion). The mixture was then left unstirred over the weekend. After 72 hours the sample was filtered and dried at 50° C. for 4 hours, and dried again at 120° C. overnight. The sample was then calcined in air at 550° C. for 4 hours.

(c) The Rh-impregnated sample (9.47 g) was added to 20 ml solution containing 1.55 g $Pr(NO_3)_3.6H_2O$ and left unstirred (after brief swirling) for 4 hours. It was drained and dried at 55° C. overnight. The sample was then calcined again in air at 550° C. for 4 hours.

(d) Sample Reduction: The catalyst sample was reduced at 400° C. for 2 hours in a stream of 1 liter/min of 24% $H_2/N$ gas, and cooled to room temperature in the same gas stream.

Catalytic Activity Testing of Pelleted Specimens in an Experimental Reactor

Feed gas composition: 1200 ppm HC as $C_3$ ($C_3H_6/C_3H_8$=2); 4% Oxygen; 500 ppm NO; 20 ppm $SO_2$; $N_2$ balance. Space velocity: 30000 $hr^{-1}$ based on catalyst bed volume (mass hourly SV=45 liter/g hr). Catalyst furnace temperature was ramped at a rate of 5° C./min and catalyst temperature was measured by a thermocouple located at mid-bed. The results of the catalytic testing of the pelleted samples are presented in Figures numbered from 8 to 10.

Figure 8:
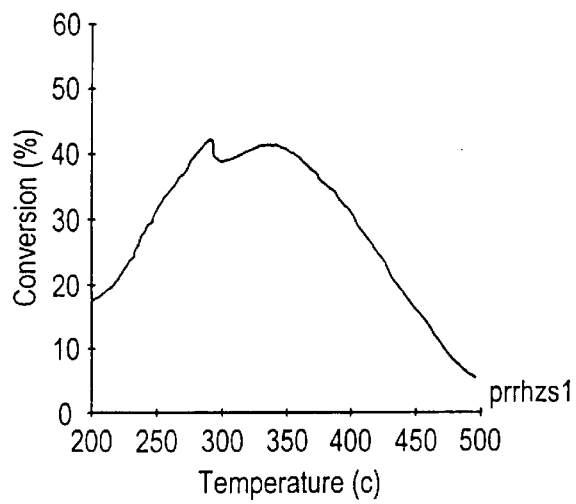
FIG. 8 is a graph of $NO_x$ conversion vs. temperature for the pelleted Example 4 catalyst according to an embodiment of the present invention containing 1% Rh and 5% Pr in a simulated exhaust stream without water and without $SO_2$.
Figure 9:
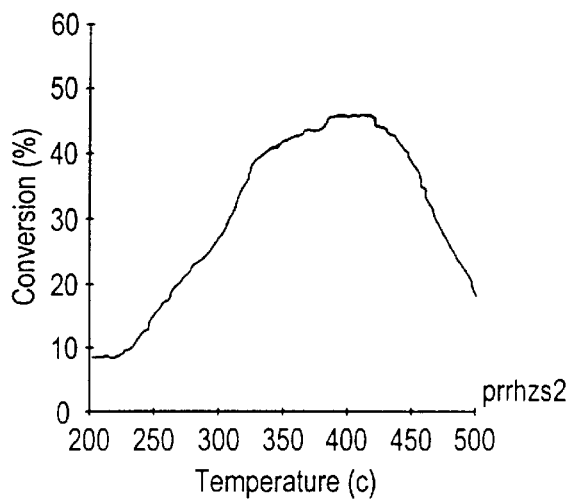
FIG. 9 is a graph of $NO_x$ conversion vs. temperature for the pelleted Example 4 catalyst in a simulated exhaust stream without water and with 20 ppm $SO_2$.
Figure 10:
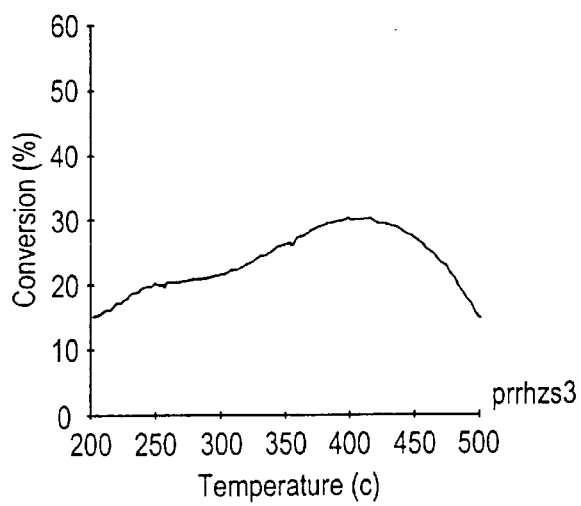
FIG. 10 is a graph of $NO_x$ conversion vs. temperature for the Example 4 pelleted catalyst in a simulated exhaust stream with 10% water and with 20 ppm $SO_2$.

FIG. 8 indicates that NO: conversion is repeatable and reproducible and exceeds 30% in the 260–380° C. temperature range. The presence of 20 ppm $SO_2$ in the gas does not influence this behavior adversely apart from shifting the optimal activity to somewhat higher temperatures as shown in FIG. 9. Finally, FIG. 10 shows that the presence of 10% water, simultaneously with the 20 ppm $SO_2$ flattens the conversion of NOx to around 20–25%, but this conversion is attainable over a wide temperature range which makes it significantly useful.

The main difference between the powder an pelleted catalysts is the absence of the double hump in the latter, possibly indicating an overlap in the activity temperature ranges of the exchanged and particles Rh in the case of the pelleted specimens. For practice the continuous broad activity range is preferable.

We claim:

1. A catalyst useful for lean-burn exhaust gas treatment comprising:

(a) zeolite having a $SiO_2/Al_2O_3$ ratio between 20 and 100;

(b) rhodium in a total concentration of 0.3 to 5.0 wt. % based on the weight of the zeolite, the rhodium being distributed in the zeolite as Rh+2 in two forms: (i) metal particles and (ii) ion-exchanged into the zeolite, the amount of the rhodium particles being 3 to 4 times the weight of the ion-exchanged rhodium, wherein said zeolite is essentially free of other monovalent or divalent ion-exchangeable metal ions; and (c) rare-earth ions having +3 or higher as their primary ionic valence acting to stabilize the zeolite, and being present in an amount of 2–10 wt. % based on the weight of the zeolite and the rare-earth ions being at least 5 times the total weight of rhodium.

2. The catalyst according to claim 1 wherein said zeolite has a $SiO_2/Al_2O_3$ ratio of 30–80.

3. The catalyst according to claim 1 wherein said rare-earth ions is selected from the group consisting of lanthanum, yttrium, cerium, and praseodymium, and a mixture of any of them.

4. The catalyst according to claim 1 wherein said zeolite is selected from the group consisting of ZSM-5, pentasil ZSM-type zeolites, offretite, and mordenite.

5. The catalyst according to claim 1 formed into pelleted shapes.

6. The catalyst according to claim 1 wherein said metal particles have, on average, a diameter of 10–500 nanometers.

7. The catalyst according to claim 1 deposited on a monolithic substrate.

8. The catalyst according to claim 7 wherein the total rhodium is 0.15–1 wt. % based on the weight of the substrate.

9. The catalyst according to claim 7 wherein the total of the stabilizer ions is 0.4–3 wt. % based on the weight of the substrate.

10. A method for treating internal combustion engine exhaust gases containing hydrocarbons, carbon monoxide, and oxygen generated by a lean-burn engine, the steps comprising:

locating in the exhaust gas passage of a lean-burn internal combustion engine a selective reduction catalyst comprising:
(a) zeolite having a $SiO_2/Al_2O_3$ ratio between 20 and 100;
(b) rhodium in a total concentration of 0.3 to 5.0 wt. % based on the weight of the zeolite, the rhodium being distributed in the zeolite in two forms: (i) metal particles and (ii) ion-exchanged into the zeolite as $Rh+2$, the rhodium particles being present in an amount 3 to 4 times the weight of ion-exchanged rhodium, wherein said zeolite is essentially free of other monovalent and divalent ion-exchangeable metal ions; and
(c) rare-earth ions having at least +3 as their primary ionic valence acting to stabilize the zeolite, being present in an amount of 2–10 wt. % based on the weight of the zeolite and the rare-earth ions being at least 5 times the total weight of rhodium; and exposing said exhaust gas to said catalyst.

11. The method according to claim 10 wherein said zeolite has a $SiO_2/Al_2O_3$ ratio of 30–80.

12. The method according to claim 10 wherein said rare-earth ions is selected from the group consisting of lanthanum, yttrium, cerium, gadolinium and praseodymium, and a mixture of any of them.

13. The method according to claim 10 wherein said zeolite is selected from the group consisting of ZSM-5, pentasil ZSM-type zeolites, offretite, and mordenite.

14. The method according to claim 10 formed into pelleted shapes.

15. The method according to claim 10 wherein said metal particles have, on average, a diameter of 10–500 nanometers.

16. The method according to claim 10 deposited on a monolithic substrate.

17. The method according to claim 16 wherein the total rhodium is 0.15–1 wt. % based on the weight of the substrate.

18. The method according to claim 16 wherein the total of the stabilizer ions is 0.4–3 wt. % based on the weight of the substrate.

* * * * *